United States Patent Office 2,968,652
Patented Jan. 17, 1961

2,968,652

POLYMERIZATION PROCESS WITH A CATALYST PREPARED BY SUBJECTING TiCl₃ TO ULTRASONIC VIBRATIONS AND ADDING AN ALUMINUM ALKYL

Thomas S. Mertes, Wilmington, Del., assignor to Sun Oil Company, Philadelphia, Pa., a corporation of New Jersey No Drawing. Filed Nov. 27, 1957, Ser. No. 699,196

1 Claim. (Cl. 260—93.7)

This invention relates to a new process for the preparation of relatively high molecular weight polymers, and more particularly relates to a process for the preparation of solid polymers of alpha-olefins, whereby much smaller quantities of catalyst are used than have heretofore been possible.

Alpha-olefins such as propylene have heretofore been polymerized to high molecular weight solid polymers. A catalyst which is especially effective for the polymerization of alpha-olefins to such relatively high molecular weight solid polymers is a lower halide of titanium, such as titanium trichloride, activated by an aluminum trialkyl, such as aluminum triethyl. The titanium trichloride is dispersed in a finely divided solid form in an inert solvent such as isooctane, and the aluminum trialkyl admixed therewith. In performing the polymerization step, an alpha-olefin is contacted with the catalyst and activator, such as by passing the olefin through a suspension of the catalyst in the inert reaction medium, and is thereby polymerized to solid polymers. Other materials can be substituted for the titanium trichloride and/or aluminum triethyl, as hereinafter described. Anhydrous and oxygen-free conditions are used throughout the process, since the catalyst is deactivated by contact with water or oxygen.

Polymerization proceeds quite rapidly in this system, solid polymer forming on the solid catalyst particles. The polymer formed on the catalyst particles eventually completely coats the particles, so that they no longer promote polymerization, and polymerization ceases. A catalyst deactivating material, such as water or an alcohol is added to the reaction mixture and the mixture is agitated, preferably by means which comminute the polymer so that catalyst particles embedded in the polymer are exposed to the deactivant. Thereafter, in order to remove the inorganic catalyst or the inorganic particles resulting from the catalyst deactivation, the reaction mixture is contacted with a strong inorganic acid such as an aqueous or alcoholic solution of nitric acid. The solid polymer is then separated from the acid solution and is washed and dried. A major proportion, usually 50% to 75%, of the polymer produced by this process is crystalline, i.e., exhibits a crystalline structure by X-ray analysis. This crystalline polymer usually has a molecular weight of 50,000 to 500,000 or more, a melting point of 160° C. to 170° C., and a yield strength in tension of 3800 to 5000 p.s.i. A product having a high proportion of crystalline polymer is especially desirable, because of its superior properties. Polyolefins produced by this method may be extruded into films for wrapping materials, or may be molded or otherwise formed into containers and many other useful articles.

In the process hereinbefore described, the rate of polymerization and amount of polymer formed is related to the amount of catalyst used, since the catalyst particles become coated with polymer, and are therefore made inactive, during the polymerization. From this standpoint, therefore, a fairly high proportion of catalyst is desirable.

However, the catalysts used are quite expensive, and in addition are difficult to remove from the polymer. It is essential that the finished polymer be substantially free of catalyst, since contaminants discolor and weaken the polymer. It is evident, therefore, that it is undesirable to use large quantities of catalyst.

Titanium trichloride of commerce is a granular material having particles as large as 250 microns or larger, and an average particle size of 15 to 40 microns. Other materials used as catalysts in this process are in a similar form. It has now been found that if these catalyst particles are reduced in size, a much higher rate and yield of polymerization is obtained with no increase in the amount of catalyst used or in other conditions of the polymerization reaction. In addition, the more finely divided catalyst produces a product which has a much higher proportion of crystalline polymer, and which has a more uniform molecular weight.

It is an object of this invention to provide a method whereby alpha-olefins may be polymerized at a relatively high rate and yield with a smaller quantity of catalyst than has heretofore been possible. It is another object to provide a method whereby alpha-olefins may be polymerized to predominantly crystalline polymers of relatively uniform molecular weight. Still another object is to provide a method whereby solid catalysts used in the polymerization of olefins may be reduced to extremely finely divided particles and are thereafter contacted with an olefin and an activator for the catalyst, whereby predominantly crystalline polymers of the olefin are produced. A further object is to provide a method for preparing predominantly crystalline polymers of olefins which are substantially free of contamination by catalyst particles.

These and other objects of this invention are attained by subjecting a dispersion of catalyst particles in an inert liquid to ultrasonic waves of an intensity such that the catalyst particles are broken down into extremely finely divided particles, and then adding this catalyst to a reaction mixture of olefin and catalyst activator in an inert, liquid reaction medium, whereby the olefin is polymerized to high molecular weight solid polymers. Alternatively, the catalyst may first be contacted with the catalyst activator and then subjected to the ultrasonic waves.

Although the process of this invention is applicable to alpha-olefins generally, that is, to olefins having a terminal double bond, for convenience the present process is described largely in terms of polymerizing propylene to form solid polypropylene. Other olefins to which this invention is applicable include ethylene, isobutylene, 3-methylbutene-1, and other alpha-olefins having from 2 to 8 carbon atoms.

In carrying out the process of this invention, the solid catalyst, or the catalyst and activator, is dispersed in an inert liquid, such as isooctane, under substantially anhydrous and oxygen-free conditions. The inert liquid which is used may be a paraffinic hydrocarbon, such as the hexanes, heptanes, octanes, nonanes, decanes and mixtures thereof and the like, or a cycloparaffinic hydrocarbon such as cyclohexane, methyl cyclopentane, decahydronaphthalene and mixtures thereof with each other and with paraffins, or with aromatics such as benzene, toluene and the like.

The solid catalyst materials used are in a particulate form. Usually the material has been ground or otherwise comminuted to a particle size of not more than 500 microns. Upon subjecting the inert liquid containing these particles to ultrasonic waves, particles are broken down to such small size that they remain suspended for much longer periods of time, or with greatly reduced agitation can be kept continuously in suspension.

By "ultrasonic waves," as used herein, is meant the vibratory waves of a frequency above the limit of the human ear, and particularly frequencies of from about 20,000 to 500,000 cycles per second. The power input, i.e., the intensity used for the present process is preferably from about 4 to about 20 watts per square centimeter, although intensities as low as one watt give good results, and much higher intensities, up to about 1000 watts per square centimeter, may be used. The conversion of energy into ultrasonic waves by the use of transducers is well known. By the term "transducer," as used herein, is meant means for converting energy into ultrasonic waves within the limits herein described. Means which utilize the piezoelectric effect, e.g., as exhibited by quartz and barium titanate, give good results and are preferred, but other means, such as the magnetostrictive devices, may be used if desired. It is believed that the ultrasonic waves employed in the processes of the invention produce cavitation throughout the inert liquid, and especially adjacent the catalyst particles, and that this cavitation produces extremely high stresses in the catalyst particles, causing them to be disintegrated into very finely divided particles, usually from about 0.1 to about 5.0 microns in size, and averaging less than 1.0 micron. The extreme agitation produced by the ultrasonic waves causes these particles to be uniformly dispersed through the inert liquid, and due to the fineness of the particles, they remain suspended after the propagation of ultrasonic waves has ceased.

Although the preferred catalyst for practicing this invention is a lower halide of titanium, other halides of the metals of groups IV, V and VI of the periodic table may also be employed. Preferably a halide of titanium, zirconium, hafnium, vanadium, niobium, chromium, molybdenum or tungsten is used. The metal of the metal compound must be in a valence other than its highest valence state, and the metal compound must be a solid. Among the catalysts which may be used are included titanium trichloride, titanium dichloride, titanium tribromide, titanium triiodide, zirconium trifluoride, vanadium trichloride and chromium trichloride. These materials may be prepared by reacting a higher valence metal halide with a suitable reducing agent, such as the metal alkyls, metal hydrides, metal borohydrides, and metal alkyl halides which are described hereinafter as being suitable activators for the catalysts of this invention. Thus a metal halide such as titanium tetrachloride, tetrafluoride, tetrabromide or tetraiodide, and the corresponding higher valence halides of the other metals of groups IV, V and VI may be reacted with an activator so that the lower valence form of the metal halide is formed, and the reaction product subjected to the ultrasonic waves. This reaction product is in solid form and includes a lower valence form of the metal halide used. Whether the higher valence metal halide or the lower valence metal halide is used, it may be mixed with the activator therefor either before or after it is subjected to the ultrasonic waves.

The disintegrated catalyst, in an inert liquid, is added to the polymerization reaction mixture, which consists of an inert liquid reaction medium, an alpha-olefin, and an activator for the catalyst. The reaction medium may be a saturated hydrocarbon such as the hexanes, heptanes, octanes, decanes, cyclopentanes, cyclohexanes, mixtures thereof and the like which are liquid under the conditions of reaction. The reaction medium may also include aromatic hydrocarbons up to about 25% without deleterious effects. Usually, the olefin is added to the reaction medium before the catalyst and activator are added, although the constituents may be added in any order. Polymerization is performed under polymerizing conditions, including a temperature of from about 0° C. to 250° C., and a pressure of from atmospheric to 10,000 p.s.i.g. (pounds per square inch gauge) or more, it being necessary that the reaction medium be maintained in the liquid phase.

The activator used is preferably an aluminum trialkyl, such as aluminum triethyl, however other materials which are also suitable activators include other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl and the magnesium and zinc analogues thereof give good results in the process and are preferred, but metal alkyls having up to about 12 carbon atoms in the alkyl groups can be used with good results. Alkali metal alkyls such as n-butyl lithium, methyl sodium, butyl sodium, phenyl isopropyl potassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used include Grignard reagents such as methyl magnesium bromide, ethyl magnesium chloride, phenyl magnesium bromide and other alkyl metal halides such as diethyl aluminum chloride and ethyl aluminum dichloride.

The quantities of catalytic components can be varied and good results obtained. A mole ratio of catalyst to activator of from 1:12 to 10:1 gives good results. The amount of reaction medium used may vary from about 500 to about 50,000 times the weight of catalyst used. Since the catalyst is in an extremely finely divided form, a relatively small amount of catalyst may easily be dispersed throughout a large amount of reaction medium, thereby providing a large number of nuclei about which polymerization can take place. When catalyst which has not been irradiated with ultrasonic waves is used, at least several times as much catalyst, say about 10 times as much catalyst, may be required to obtain equivalent results, due in part to the fact that fewer particles per unit weight are available to form nuclei for polymerization.

Although the steps hereinbefore described are essentially those of a batch process, the process of this invention is equally adaptable to continuous operation. For example, the catalyst particles may be injected continuously into a stream of inert liquid, and the liquid be continuously flowed through an ultrasonics zone, at a velocity such that the catalyst particles remain in the ultrasonics zone long enough to be disintegrated. The catalyst and inert liquid may then be injected into a reactor where the olefin and activator are being continuously injected and where solid polymer is being continuously removed.

After the polymerization step, the solid polymer is separated from the reaction medium, and a catalyst deactivating material, such as water or alcohol, is added to the polymer. The polymer is then ground, chopped or otherwise comminuted in the presence of the deactivator, so that the catalyst particles are exposed and deactivated. The liquid deactivant is then removed from the polymer such as by draining or filtering, and the polymer washed with a dilute inorganic acid, such as nitric acid, to wash out the catalyst and the other inorganic material.

The polymer obtained by this process is a white predominantly crystalline solid material which is substantially free of catalyst particles and catalyst residue, usually containing less than 50 p.p.m. (parts per million), whereas polymer made by other processes normally have from 200 to 500 p.p.m. of such catalyst materials (calculated as the metal). Consequently, the polymer products of the present process are white and free of discoloration, whereas formerly only greyish or yellowish products were obtained. The polymers produced by the present process therefore have much greater utility in applications where appearance is important.

The following examples, wherein "parts" refers to parts by weight, illustrate the process of this invention:

*Example I*

Titanium trichloride of commerce was examined and found to have a minimum particle size of 2 microns, a maximum size of 254 microns, and average size of 25 microns. One part of this titanium trichloride is dispersed in 10 parts of isooctane, under anhydrous and oxygen-free conditions. A nitrogen atmosphere at 5 p.s.i.g. pressure is provided to keep out air. A piezoelectric transducer is attached to the vessel containing the isooctane, and is operated for two minutes at 50,000 cycles per second frequency, and at an intensity of 10 watts per square centimeter. The titanium trichloride is broken down so completely that the particles remain in suspension long after the ultrasonic radiation ceases. A portion of the isooctane containing suspended titanium trichloride is heated to evaporate the isooctane. The titanium trichloride particles remaining are from 0.2 to 2.7 microns in size, and 70% are less than 1.0 micron.

The remaining isooctane, containing 0.95 part of suspended titanium trichloride, is added to a reactor containing 5,000 parts of reaction mixture, consisting of 23 weight percent of propylene and 0.6 part of aluminum triethyl, maintained at 85° C. to 90° C. and a pressure of 100 p.s.i.g. Polymerization begins immediately, as evidenced by a decrease in the pressure in the reactor. Additional propylene is injected periodically to maintain the pressure in the reactor at approximately 100 p.s.i.g. After 3.1 hours, the rate of polymerization has decreased substantially. Excess propylene is vented, the reaction medium drained off, and the remaining polymer ground in the presence of methanol. The methanol is then drained off, and the polymer washed with dilute nitric acid, and then dried. A total of 760 parts of polypropylene are formed which is 96% crystalline polymer and which has an average molecular weight of 212,000. The material contains only 30 p.p.m of titanium, and products molded from it are white and clear.

*Example II*

One part of the purchased titanium trichloride is dispersed in 10 parts of isooctane and added in this form to a reactor containing the same mixture as is described in Example I. The polymerization reaction began in about five minutes, and proceeded for 15.3 hours. After deactivating, washing and drying, as described in Example I, 529 parts of polypropylene which has an average molecular weight of 155,000 is obtained. This material is 70% crystalline polymer and contains 230 p.p.m. of titanium. Products molded from it are discolored.

*Example III*

The following data shows that other comminuting methods do not produce a catalyst which is equivalent in the polymerization of olefins.

One part of the purchased titanium trichloride was ground in a ball mill for one hour in mineral oil. The resulting titanium trichloride had a maximum particle size of 190 microns, a minimum size of 1 micron, and an average size of 13 microns. This material was used in the polymerization process as described in Example I, using substantially the same proportions and conditions. The polypropylene obtained was 71% crystalline, having an average molecular weight of 166,000 and contained 210 p.p.m. of titanium. Products molded from this polymer were discolored.

Polymers produced by the process of this invention are thermoplastic solids which may be molded, extruded, or otherwise fabricated into piping, various containers, films for wrapping food products, and many other useful products.

The invention claimed is:

A process for preparing predominantly crystalline polypropylene which comprises dispersing titanium trichloride particles in an inert liquid hydrocarbon, subjecting the inert liquid containing the titanium trichloride particles to ultrasonic waves having a frequency of from 20,000 to 500,000 cycles per second and an intensity of from 4 to 20 watts per square centimeter, whereby the titanium trichloride particles are reduced in size to from about 0.1 to about 5.0 microns, and thereafter introducing the inert liquid hydrocarbon containing the titanium trichloride particles into a reaction mixture comprising an inert liquid reaction medium, propylene and an alkyl aluminum compound, said reaction mixture being maintained at a temperature of from 0° C. to 250° C. and a pressure of from atmospheric to 10,000 p.s.i.g. in the absence of ultrasonic vibration, whereby polymerization of the propylene to a predominantly crystalline polymer takes place, separating the propylene polymer from the reaction mixture, deactivating and washing out the catalyst from the polymer, and recovering predominantly crystalline polypropylene containing less than 50 p.p.m. of titanium.

References Cited in the file of this patent

UNITED STATES PATENTS

| 2,742,408 | La Porte | Apr. 17, 1956 |
| 2,832,759 | Nowlin et al. | Apr. 29, 1958 |

FOREIGN PATENTS

| 702,811 | Great Britain | Jan. 30, 1954 |
| 526,101 | Italy | May 14, 1955 |
| 533,362 | Belgium | May 16, 1955 |
| 538,782 | Belgium | Dec. 6, 1955 |

OTHER REFERENCES

Campbell: "Emulsification by Ultrasonics," article in The Pharmaceutical Journal, Aug. 13, 1949, pages 127–128.

Catalysis, Emmett, Reinhold Publishing Corp. N.Y. (1954), page 31, vol. I.